(12) United States Patent
Ledvina et al.

(10) Patent No.: US 10,759,389 B2
(45) Date of Patent: *Sep. 1, 2020

(54) MOBILE DEVICE FOR COMMUNICATING AND RANGING WITH ACCESS CONTROL SYSTEM FOR AUTOMATIC FUNCTIONALITY

(71) Applicant: Apple Inc., Cupertino, CA (US)

(72) Inventors: Brent M. Ledvina, San Francisco, CA (US); Robert W. Brumley, Menlo Park, CA (US); Sriram Hariharan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,838

(22) Filed: Oct. 29, 2019

(65) Prior Publication Data

US 2020/0062217 A1 Feb. 27, 2020

Related U.S. Application Data

(63) Continuation of application No. 15/983,388, filed on May 18, 2018, now Pat. No. 10,486,646.

(60) Provisional application No. 62/565,637, filed on Sep. 29, 2017.

(51) Int. Cl.
*B60R 25/24* (2013.01)
*H04W 12/06* (2009.01)
(Continued)

(52) U.S. Cl.
CPC ............ *B60R 25/246* (2013.01); *G01S 13/76* (2013.01); *H04L 63/18* (2013.01); *H04W 4/023* (2013.01); *H04W 4/40* (2018.02); *H04W 4/80* (2018.02); *H04W 12/003* (2019.01); *H04W 12/06* (2013.01); *H04W 12/08* (2013.01); *H04W 64/00* (2013.01); *H04W 76/10* (2018.02);
(Continued)

(58) Field of Classification Search
CPC ...... B60R 25/246; H04W 4/80; H04W 12/06; H04W 12/00503; H04L 63/18; H04L 63/107
USPC ......................................................... 340/5.6
See application file for complete search history.

(56) References Cited

U.S. PATENT DOCUMENTS 8,930,045 B2   1/2015   Oman et al.
8,976,005 B2   3/2015   Zivkovic et al.
(Continued)

OTHER PUBLICATIONS

U.S. Appl. No. 15/983,388, "Non-Final Office Action", dated Apr. 1, 2019, 6 pages.

(Continued)

*Primary Examiner* — Vernal U Brown
(74) *Attorney, Agent, or Firm* — Kilpatrick Townsend & Stockton LLP

(57) ABSTRACT

Two different wireless protocols can be used for ranging between a mobile device and an access control system (e.g., a vehicle). The first wireless protocol (e.g., Bluetooth®) can be used to perform authentication of the vehicle and exchange ranging capabilities between a mobile device (e.g., a phone or watch) and the vehicle. The second wireless protocol (e.g., ultra-wideband, UWB) can use a pulse width that is less than a pulse width used by the first wireless protocol (e.g., 1 ns v. 1 μs). The narrower pulse width can provide greater accuracy for distance (ranging) measurements.

20 Claims, 10 Drawing Sheets

(51) Int. Cl.
| | |
|---|---|
| *H04W 4/80* | (2018.01) |
| *H04L 29/06* | (2006.01) |
| *G01S 13/76* | (2006.01) |
| *H04W 12/08* | (2009.01) |
| *H04W 4/02* | (2018.01) |
| *H04W 12/00* | (2009.01) |
| *H04W 4/40* | (2018.01) |
| *H04W 76/10* | (2018.01) |
| *H04W 64/00* | (2009.01) |
| *H04L 29/08* | (2006.01) |

(52) U.S. Cl.
CPC ... *B60R 2325/101* (2013.01); *B60R 2325/108* (2013.01); *B60R 2325/205* (2013.01); *H04L 63/107* (2013.01); *H04L 67/12* (2013.01); *H04W 4/027* (2013.01); *H04W 12/00503* (2019.01)

(56) References Cited

U.S. PATENT DOCUMENTS

| | | | |
|---|---|---|---|
| 9,563,990 | B2 | 2/2017 | Khan et al. |
| 10,486,646 | B2 * | 11/2019 | Ledvina ............... H04W 4/023 |
| 2010/0103036 | A1 | 4/2010 | Malone et al. |
| 2013/0090744 | A1 | 4/2013 | Tran |
| 2014/0028440 | A1 | 1/2014 | Takeuchi et al. |
| 2016/0277925 | A1 | 9/2016 | Bengtsson et al. |
| 2017/0111346 | A1 | 4/2017 | Tung |
| 2017/0236351 | A1 | 8/2017 | Menard et al. |

OTHER PUBLICATIONS

U.S. Appl. No. 15/983,388, "Notice of Allowance", dated Jul. 18, 2019, 5 pages.

PCT/US2018/047308, "International Search Report and Written Opinion", dated Nov. 21, 2018, 12 pages.

\* cited by examiner

MOBILE DEVICE FOR COMMUNICATING AND RANGING WITH ACCESS CONTROL SYSTEM FOR AUTOMATIC FUNCTIONALITY

CROSS-REFERENCES TO RELATED APPLICATIONS

This application is a continuation application of U.S. patent application Ser. No. 15/983,388, now U.S. Pat. No. 10,486,646, entitled MOBILE DEVICE FOR COMMUNICATING AND RANGING WITH ACCESS CONTROL SYSTEM FOR AUTOMATIC FUNCTIONALITY, which claims the benefit of U.S. Provisional Application No. 62/565,637, filed Sep. 29, 2017, entitled "MOBILE DEVICE FOR COMMUNICATING AND RANGING WITH ACCESS CONTROL SYSTEM FOR AUTOMATIC FUNCTIONALITY," the disclosures of which are incorporated by reference herein in their entireties.

BACKGROUND

Cars often come with proximity key fobs that can automatically unlock the doors of a car when the person carrying a fob is close. People often have their phones or smart watches with them. It can be inconvenient to carry both items. However, it can be difficult to obtain accurate distance measurements between the phone and the car using standard communication protocols (e.g., Bluetooth®) typically used between phones and cars, thereby making the proper control of unlocking the doors difficult.

BRIEF SUMMARY

To provide accurate distance measurements, embodiments can use two different wireless protocols. The first wireless protocol (e.g., Bluetooth®) can be used to perform authentication of the vehicle and exchange ranging capabilities between a mobile device (e.g., a phone or watch) and the vehicle. The second wireless protocol (e.g., ultra-wideband, UWB) can use a pulse width that is less than a pulse width used by the first wireless protocol (e.g., 1 ns v. 1 μs). The narrower pulse width can provide greater accuracy for distance (ranging) measurements.

Example ranging capabilities can include specifying a format for ranging messages between the mobile device and the vehicle, a frequency range to use, a number of antenna units of the vehicle, and encryption protocols for ranging messages using the second wireless protocol. Using the first wireless protocol to specify such ranging capabilities allows the mobile device to connect and be used with a variety of vehicles that each have different settings and capabilities.

The mobile device can send a ranging request message that includes a first set of pulses to one or more antenna units of the vehicle and receive one or more ranging response messages that includes a second set of pulses. In various embodiments, times of the transmission and reception of such pulses can be determined and sent to the vehicle so the vehicle can determine the distance between the mobile device and the vehicle, or the mobile device can determine the distance for sending to the vehicle. Various functionality (e.g., as set by a user) can automatically be performed based on a distance crossing a threshold or a rate of change of the distance exceeding a threshold.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
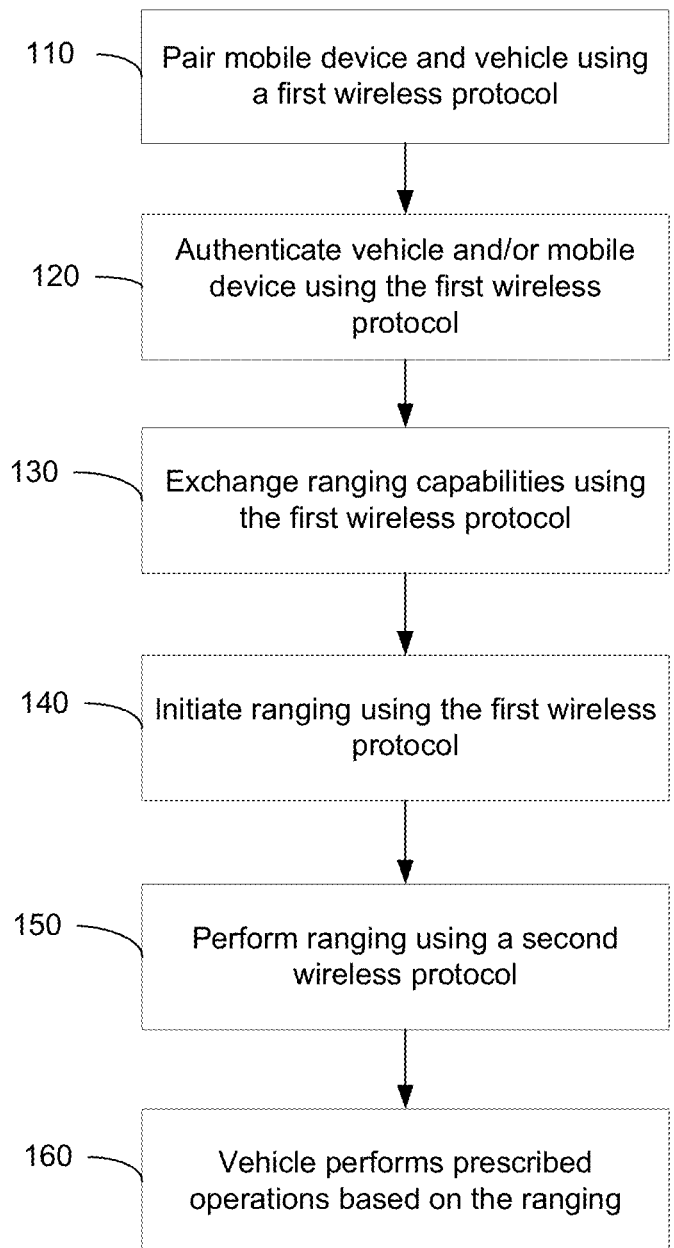
FIG. 1 is a flowchart illustrating a method for automated distance-based access control to a vehicle according to embodiments of the present invention.

Embodiments can provide a mobile device (e.g., phone or watch or other accessory) that securely communicates with a car for authentication and ranging to unlock the doors in a timely fashion when the user is close to the car. Other operations besides unlocking can also be provided, such as turning on lights, engine, heater, air conditioner, or providing information from the car to the mobile device. The secure communication can involve key exchanges typically involved in a first wireless protocol, but also involve key negotiations occurring in the first wireless protocol, but where the keys are used later with a second wireless protocol used for ranging, e.g., ultra-wideband (UWB). Cryptographic keys can also be used as part of challenge-response messages for authenticating the mobile device and the vehicle to each other.

As part of authentication, different access privileges can be provided. For example, an owner's child might have a phone but the access privilege for that phone might be restricted to just unlocking the backseat and cannot start the engine. In various embodiments, such access privileges can be programmed into the phone (e.g., when commands are provided from the phone to the car for particular functionality) or programmed into the car for a particular phone, where a device identifier can be used to determine when a particular phone is communicating with the vehicle. Some embodiments can extend to multiple people approaching the vehicle, each with a separate mobile device for which ranging can be performed independently.

In some embodiments, Bluetooth® (e.g., Classic, high speed, or low energy (BTLE), collectively referred to as BT)

can be used to authenticate the mobile device with the vehicle. But, BT pulses are wide (e.g., 1 microsecond) and do not allow for accurate distance measurements. Instead, UWB can used for the distance measurements as the pulses are more narrow (e.g., ~1 nanosecond), thereby allowing for better time-of-flight calculations. UWB may not be suitable for authentication and other data communication where guaranteed data transfer latency is desired.

Accordingly, a mobile device can use a first wireless protocol (e.g., BT) for authentication and exchange of ranging capabilities (e.g., message format for ranging, a number of antenna units, encryption protocols, etc.) with an access control system, such as a vehicle or a building (e.g., as part of a household lock). Examples of vehicles include cars, trucks, boats, and trains. Additionally, messages over the first wireless can start the ranging process, which uses a second wireless protocol (e.g., UWB) with pulses that are narrower than pulses used in the first wireless protocol for determining the distance between the two devices. Defined functions can be performed at various distances from the vehicle (or other access control system, such as a building or other structure (e.g., a fence) that includes a lock on a gate, door, etc.), e.g., five meters away the lights turn on and two meters away the vehicle unlocks. Any of the discussion below regarding a vehicle is also applicable to other access control systems.

I. Communication and Ranging Using Two Protocols

A first wireless protocol link between a mobile device (e.g., a phone, tablet, or a watch) and a vehicle can be used for authentication, and then used to initiate and control a second wireless protocol (e.g., UWB) for ranging and exchange of distance information. For example, the first wireless protocol can provide a low power framework to negotiate security keys, ranging intervals, and to initiate ranging over UWB.

FIG. 1 is a flowchart illustrating a method 100 for automated distance-based access control to a vehicle according to embodiments of the present invention. Method 100 is presented generally for both devices to affect an operation on the vehicle. One skilled in the art will appreciate which steps are performed by which device.

At block 110, the mobile device and vehicle are paired using a first wireless protocol. As explained in further detail later, the pairing (e.g., BT pairing) can involve an authentication between the mobile device and the vehicle via any one of various techniques. The pairing can result in a shared secret being saved on both devices, where the shared secret can be used for future authentications (e.g., via a challenge response) and/or encryption of messages between the mobile device and the vehicle. The mobile device can assume the central role during the initial setup and pairing.

Identity addresses (e.g., media access control (MAC) addresses) of the mobile device and the vehicle can be exchanged during pairing. For example, a unique 48-bit address can be used for each BT device. The mobile device can use resolvable private addresses and rotate the address periodically, e.g., a random value can change at timing intervals as may occur when a mode of BTLE Privacy is used. Additionally, resolution keys (e.g., BT identity resolution keys (IRK)) can be exchanged at the time of pairing, which allows a device to translate the random MAC addresses in advertising packets to the real MAC address for authentication purposes. If the vehicle supports multiple BT controllers, all controllers may use the same identity address and resolution key. Each controller may have a different random resolvable address at any time.

At block 120, the vehicle and/or the mobile device can be authenticated using the first wireless protocol when the mobile device. This authentication may occur immediately after pairing or at some later time. For example, the mobile device and the vehicle can be paired, and then the user can leave the vehicle. The user can then return the next day or at any later time, and an authentication can be performed using information obtained during the pairing process. As an example, once paired, the mobile device can always be in an advertising mode and assume a peripheral role in all subsequent connections to the vehicle. The mobile device may transmit multiple advertising packets, each with different payloads. The resolvable random address in the payload can be used by the vehicle to identify a paired device, e.g., using an IRK. The vehicle can filter advertising packets based on payload.

The vehicle can initiate a BT (e.g., BTLE) connection to the mobile device when it receives the advertising packet from a paired mobile device, thereby having the vehicle act as the central device for this connection. The BT connection can be initiated by the vehicle sending a response message that indicates a desire to create a connection and includes an identifier of the vehicle. A connection interval (e.g., 30 ms) may be required by the mobile device.

At block 130, the mobile device and the vehicle can exchange ranging capabilities using the first wireless protocol. The exchange of ranging capabilities can ensure that the signaling between mobile device and the vehicle is performed in a consistent manner by both devices. Such exchange can allow the mobile device to adapt to new vehicles, e.g., ones with different numbers and types of antenna units. Example ranging capabilities can include specifying a format for ranging messages between the mobile device and the vehicle, a frequency range to use, a number of antenna units of the vehicle, and encryption protocols for ranging messages using the second wireless protocol.

At block 140, ranging can be initiated using the first wireless protocol. In some implementations, the initiation can be started by a ranging request message sent from the mobile device or the vehicle. The responding device can respond with a start notification event (message). Once the start notification event occurs, ranging can be performed using a second wireless protocol, e.g., by turning on corresponding radios within a specified time of receiving the start message. Further examples and details are provided herein.

At block 150, ranging can be performed using a second wireless protocol (e.g., UWB). After the initiation signals using the first wireless protocol, the vehicle can begin scanning for ranging signals at a specified time using one or more vehicle antenna units corresponding to the second wireless protocol. The one or more vehicle antenna units can receive one or more ranging request messages and send one or more ranging response messages. A control unit in each of the one or more vehicle antenna units or shared among them can perform various levels of processing of such ranging messages, e.g., to determine time stamps. The mobile device can receive the ranging response messages and determine time stamps for the transmission of the one or more ranging request messages and time stamps for the one or more ranging response messages. The mobile device can send these time stamps to the vehicle for determining a distance between the mobile device and the vehicle. In other implementations, the mobile device can determine the distance based on transmission and reception time of ranging signals. The ranging can continue until a stop ranging request is processed.

At block 160, the vehicle can perform prescribed operations based on the ranging. For example, the vehicle can determine that the mobile device is within a first threshold such that a first operation is performed, e.g., lights of the vehicle are to be turned on. Further ranging can be performed to determine distances over time. When the mobile device is within a closer threshold, a second operation can be performed, e.g., a door can be unlocked.

In some embodiments, the operations can depend on a trajectory of the mobile device, e.g., which side of the vehicle the mobile device is approaching. For example, if a mobile device is approaching the passenger side, then potentially just the passenger door can be unlocked. If the mobile device approaches the back of the vehicle, then a trunk or hatch can be unlocked.

Figure 2:
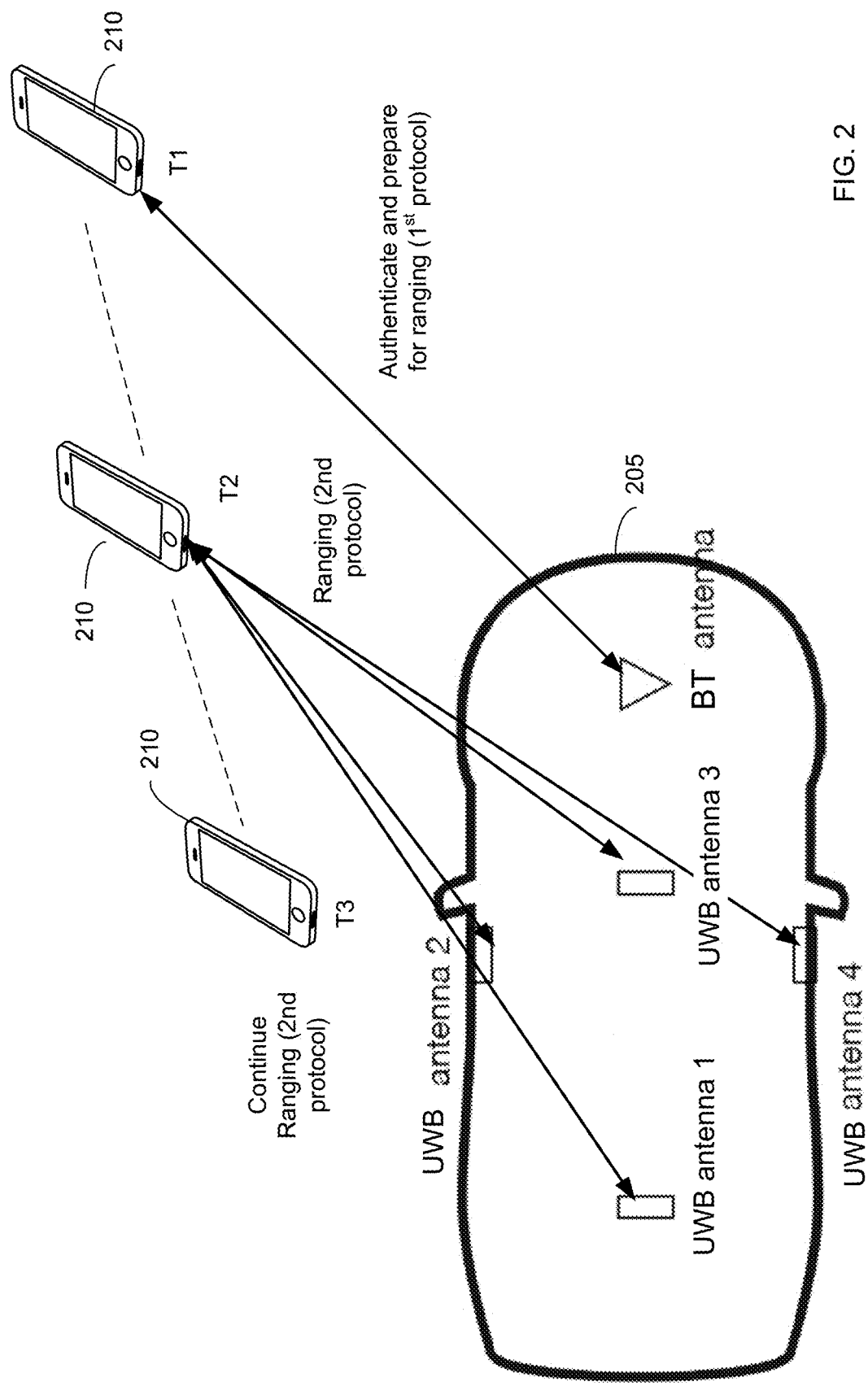
FIG. 2 shows an exaggerated movement of a mobile device communicating with a vehicle using a first wireless protocol to authenticate and prepare for ranging and participating in ranging using a second wireless protocol according to embodiments of the present invention.

FIG. 2 shows an exaggerated movement of a mobile device 210 communicating with a vehicle 205 using a first wireless protocol to authenticate and prepare for ranging. The mobile device then participates in ranging using a second wireless protocol according to embodiments of the present invention. Mobile device 210 and vehicle 205 are assumed to have already been paired, e.g., so that a secure channel has already been established between the two devices via a shared secret. Mobile device 210 is shown at three times T1-T3. The actual movement of mobile device 210 between these times would typically be less than that shown, as the distance has been exaggerated for ease of illustration. Vehicle 205 includes a BT antenna and four UWB antennas 1-4, although other numbers of UWB antennas are possible.

At a first instance in time T1, mobile device 210 can use the first wireless protocol to authenticate the vehicle and vice versa. For example, mobile device 210 can send an unencrypted random number to vehicle 205. Vehicle 205 can encrypt the random number using a shared secret established at the time of pairing, and send the encrypted value in a message to mobile device 210, which can decrypt the message to confirm that the same random number is received.

After authentication and still nominally at T1, mobile device 210 and vehicle 205 can exchange information about the ranging that is to occur at later times (e.g., times T2 and T3). The information exchanged can ensure that both devices are performing the ranging in a same manner and that the ranging occurs in a synchronized fashion.

At time T2, mobile device 210 or vehicle 205 can send an initial ranging message, which can include a series of pulses. These pulses are narrower than the pulses used in the first wireless protocol at time T1. Mobile device 210 can broadcast the initial ranging message so that each of the four UWB antennas 1-4 of the vehicle can receive it. Mobile device 210 can track the exact time (e.g., to nanosecond accuracy) at which the initial ranging message was sent. Each of the UWB antennas can send a ranging response message, which can include an identifier that identifies which UWB antenna sent a particular response message. Mobile device 210 can track the exact times for receiving the four UWB ranging response messages.

In some embodiments, mobile device 210 can send the tracked times to vehicle 205, which may use its own tracked times of receiving the initial ranging message at each of UWB antennas 1-4 and the times of sending each of the four ranging response messages to determine the distance between the mobile device and the vehicle. Differences in the times of sending and receiving each of the messages can be used to determine the distance, e.g., when the clocks of the two devices are synchronized. As another example, a time delay of receiving the initial ranging response message and sending a ranging response message can be subtracted from the sending and receiving times at the mobile device 210 to obtain the round trip time, which can be translated to a distance based on the speed of the electromagnetic signal. The known positions of the different UWB antennas in the vehicle can be used to triangulate the position of the mobile device 210 with respect to vehicle 205.

In other embodiments, mobile device 210 can determine the distance from vehicle 205. For example, if the ranging information exchanged by the vehicle includes relative positions of the UWB antennas of the vehicle and an expected delay between receiving a ranging request message and transmitting a ranging response message, mobile device 210 can determine the distance using the tracked times of it sending and receiving ranging messages.

II. Example Protocols and Signaling

The two wireless protocols can be BT and UWB. Details about each wireless protocol are described below, along with further details about a sequence of messaging between the mobile device and the vehicle.

A. First Wireless Protocol (e.g., Bluetooth)

The mobile device and the vehicle may have multiple antennas for the first wireless protocol (e.g., BT). BT can use short-wavelength ultra-high frequency (UHF) radio waves in the ISM band from 2.4 to 2.485 GHz.

Certain modes of the first wireless protocol can be used over a relatively long range. For example, one BT radio can increase a communication range by using a lower packet coding of 125 kbps or 500 kbps and by increasing a maximum transmission power (e.g., to +20 dBm). Such a radio can be used for both advertising and data packets and provide range up to 100 meters, as opposed to a lower power mode that may work only up to 20 meters. Thus, if a user was approaching the vehicle moving at a rate of 1.5 meters per second, the 100 meter range would still provide sufficient time for authentication and to negotiate ranging parameters, as well as send a ranging start message. Such extra time to establish communication can be advantageous when there can be interference from other cars, which might otherwise delay detection of the mobile device and start of ranging.

But, these packets can be roughly 2 to 8 times longer duration, e.g., up to about 16 milliseconds, which does not make them suitable for ranging. A one microsecond pulse provides a range that is +/−300 meters. And, even regular power modes for BT provide pulses that are not suitable for ranging.

B. UWB

The second wireless protocol has a narrower pulse than the first wireless protocol, e.g., a narrower full width at half maximum (FWHM). In some implementations, the second wireless protocol (e.g., UWB) can provide distance accuracy of 5 cm or better. In various embodiments, the frequency range can be between 3.1 to 10.6 GHz. Multiple channels can be used, e.g., one channel at 6.5 GHz another channel at 8 GHz. Thus, in some instances, the second wireless protocol does not overlap with the frequency range of the first wireless protocol. The mobile device and the vehicle may have multiple antennas for the second wireless protocol.

The second wireless protocol can be specified by IEEE 802.15.4, which is a type of UWB. Historically, UWB was to be used for high bandwidth communication, but there was interference with GPS. Each pulse in a pulse-based UWB system can occupy the entire UWB bandwidth (e.g., 500 MHz), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

C. Sequence Diagram

Figure 3:
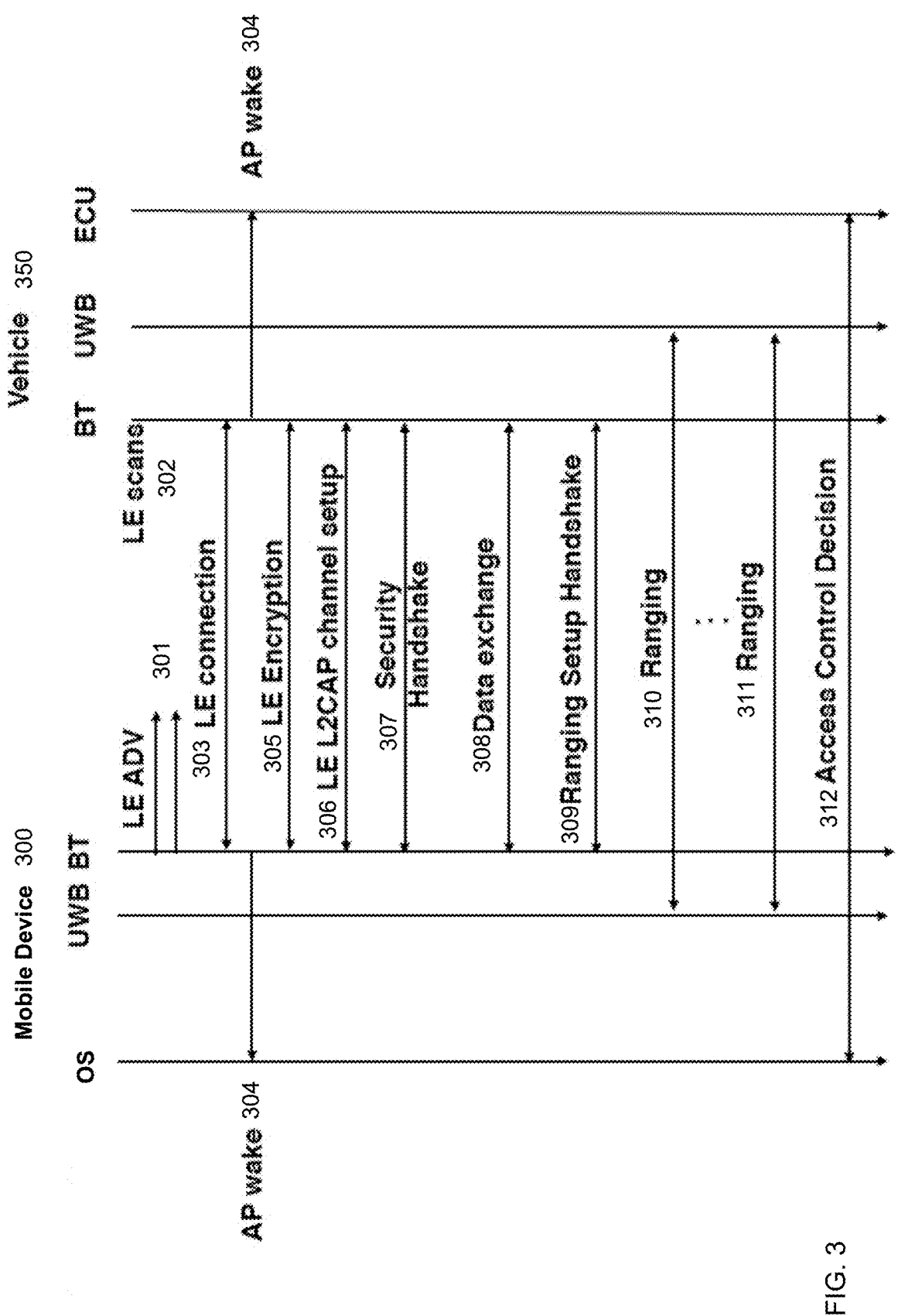
FIG. 3 shows a sequence diagram of communications between a mobile device and a vehicle involving BT and UWB protocols according to embodiments of the present invention.

FIG. 3 shows a sequence diagram of communications between a mobile device 300 and a vehicle 350 involving BT and UWB protocols according to embodiments of the present invention. Mobile device 300 and vehicle 350 are assumed to be already paired so the vehicle has the credentials of the mobile device, and the mobile device has the credentials of the vehicle. Mobile device 300 can be in a screen off state or be actively in use by a user. Steps of the sequence diagram may be optional.

At 301, a BT antenna of mobile device 300 transmits advertisement signals, e.g., in a low energy (LE) mode. The mobile device can broadcast advertisement signals at some duty cycle, without the user having to provide any user input. Having mobile device 300 transmit the advertisement signals can be preferable to vehicle 350 transmitting advertisement signals. If vehicles were advertising, then there could be excessive advertising. For example, if all the cars in a parking lot were advertising (e.g., with only three channels available to use for advertising beacon signals), the channels would get saturated. Another problem is that if the mobile device was in a pocket, it would be in a battery save mode and need to scan at a very low duty cycle so the vehicle would have to scan at a high rate, e.g., every 20 milliseconds to establish a connection.

At 302, a BT antenna of vehicle 350 scans at some duty cycle. In some embodiments, vehicle 350 can have more than one BT antenna, where any of the BT antennas could detect the advertisement signal from mobile device 300. The advertisement and scanning can be part of a discovery process for the two devices to detect each other, so that a connection can be created.

At 303, a BT connection is created between the two devices. For example, vehicle 350 can respond with a message that includes credentials (e.g., an identifier) of vehicle 350, and mobile device 300 can respond with its credentials. In some implementations, each device can check the network address with addresses stored for previously-paired devices, e.g., so as to retrieve cryptographic keys are other information used for the connection.

At 304, the processors of the two devices are awoken to communicate with the respective BT antenna devices to perform signal processing and provide control signals to the BT antenna devices for transmitting signals. For example, the operating system of mobile device 300 can access a database (e.g., a table) of paired devices to match a stored credential with the credential obtained from vehicle 350. Similarly, the engine control unit (ECU) of vehicle 350 can access a database of paired devices to match a stored credential with the credential obtained from mobile device 300. Information from each of the profiles of each device can be used for later stages of communication.

In some embodiments, the ECU can be programmed with such functionality. In other embodiments, a software upgrade can be applied to the ECU. Further, the ECU can include one or more hardware devices that are added after manufacturing, where such one or more hardware devices can interface with antennas that implement the first or second wireless protocols. Such antennas may also be added after manufacturing, e.g., as part of an after-market installation.

At 305, encryption keys are derived by each of the two devices. For example, the corresponding profiles matched to the received credentials can include a shared secret, which can be used to derive an encryption key. The derivation can be performed according to a default procedure, e.g., based on a counter or a time stamp.

As part of this stage, a first level of challenge response can be performed as part of authentication. For example, mobile device 300 can provide a random number to vehicle 350, which can use an encryption key to provide the response. Mobile device 300 can match the response to the expected encrypted value corresponding to the random number.

At 306, a communication channel is setup. The communication channel can include a an intermediate layer between an application layer and a lower layer, e.g., a host controller interface (HCI). In some embodiments, the intermediate layer can be a logical link control and adaptation protocol (L2CAP) layer. This layer can be responsible for protocol multiplexing capability, segmentation, and reassembly operation for data exchanged between the host and the protocol stack.

At 307, a security handshake is performed between mobile device 300 and vehicle 350. The security handshake can provide an extra level of protection for unlocking the vehicle on top of typical BT authentication. Mobile device 300 and vehicle 350 can each have a hardware secure element that can store a key. The keys in the secure element can be used in a challenge response for an extra level of authentication. In various embodiments, the keys can be hardware keys added by a manufacturer or obtained in a provisioning process. For a provisioning process, each of the devices can communicate with a server (e.g., a website), which can provide the key to be stored in the hardware secure element. The hardware secure element can be a tamper-resistant platform (typically a one chip secure microcontroller) capable of securely hosting applications and their confidential and cryptographic data (e.g. key management).

An application on mobile device 300 (e.g., as part of the operating system or an applications installed on the operating system) that is in communication with the BT circuit can communicate with the secure element and can inform the secure element of a connection to a particular vehicle. The secure element can generate a challenge (e.g., a random number), which is sent to vehicle 350. Once received, vehicle 350 can send the challenge to its secure element, which can generate a response. The secure element on mobile device 300 can confirm the response, e.g., by knowing the hardware keys of provisioned devices. The secure element can store the keys with matching credentials of vehicles, which can be obtained from a provisioning server after a vehicle is paired.

In other implementations, mobile device 300 can track which vehicles it is paired with and determine which vehicle is currently connected. The secure element can generate a challenge based on the key provision for that vehicle. Via authentication, vehicle 350 knows which mobile device corresponds to the current link and thus knows what key to use to respond to the challenge. Vehicle 350 can obtain the key corresponding to the mobile device during the pairing process. Other embodiments can have the challenge start with vehicle 350.

A challenge message can include information indicating the type of message being a challenge. The location of such information in the packet definition of such a message can be added as part of a ranging service over the first wireless protocol defined in the operating system or an installed application.

In other embodiments, one or more new keys (e.g., shared secret) for this security handshake can be exchanged after every interaction session, e.g., after the vehicle is unlocked. Then, for the next interaction session (i.e., next time the user uses the vehicle), one device can send data to the other device as part of a challenge, and the other device can encrypt it or perform a transformation to obtain a response that is compared to an expected value.

At 308, any additional data is exchanged. For example, the vehicle might send information about fuel in the tank or other information, e.g., as may be defined by a user. In some implementations, the information could appear as a notification or a pop-up window.

At 309, a ranging setup handshake is exchanged between the mobile device 300 and vehicle 350. The ranging setup handshake can include the ranging capabilities of the two devices. Information about the UWB receivers on the vehicle can be provided as different vehicles can have different numbers of UWB receivers, or a vehicle may want to only turn on a few. A coarse ranging may occur at first, with finer ranging using more UWB receivers occurring after the mobile device is closer. For instance, more receivers can be turned on when the mobile device is estimated to be within the vehicle, so that high accuracy is obtained before the user is allowed to start the engine of the vehicle. Which UWB receivers are initially turned on can depend on which side of the vehicle the user is approaching. Other settings/parameters may be provided after the pairing or between ranging procedures, e.g., as part of a dynamic decision or updating of software or physical components.

Other examples for ranging capabilities include a number of antennas, location of those antennas (e.g., a relative distances between the antennas and/or between an origin in the vehicle, such as the ECU), how many antennas to use, encryption protocols, packet format, modes of operation, and supported frequency range. Such capabilities may reflect a software update of the vehicle or the mobile device, resulting in a new or different capability.

The ranging setup handshake can include a negotiation about how to carry out the ranging, such as how often to range or how to schedule the ranging (e.g., when there are multiple vehicles or multiple mobile devices—round robin, one at a time, or other options). For instance, there may be multiple devices in the vicinity of the vehicle (e.g., family members all going to one car), or multiple vehicles in the vicinity of a mobile device (e.g., three cars in a garage). A mobile device may know it is connected to three different vehicles, and thus the mobile device may want a lower rate of range measurements to each vehicle (e.g., 25 milliseconds) or schedule a particular time/frequency to perform ranging with each vehicle. Similarly, a vehicle may perform such scheduling when multiple devices are near. The ranging setup handshake can also depend on whether the vehicles are in communication with each other.

The ranging setup handshake can specify when ranging is to begin, e.g., by coordinating when the vehicle should turn on the UWB radios on and start looking for packets. Start messages sent over BT can be used, e.g., using particular messages as detailed below. A duty cycle for when the UWB radios are on can be specified, e.g., 1 KHz or 10 KHz. For instance, when a start message is received, the devices can agree to start ranging 100 milliseconds (or 90 milliseconds for extra margin) from the start message and then every 1 KHz after that.

The ranging setup handshake can derive a new set of sessions keys for UWB ranging. The keys can be updated periodically, e.g., for each session or every Nth session. In some embodiments, the session keys can be derived from a common shared secret that was used in a challenge-response for the security handshake, where the derivation uses default or negotiated procedures. Accordingly, the ranging setup handshake can act as a control channel to inform the vehicle and the mobile device about what to expect for the ranging.

At 310, ranging is performed, e.g., using UWB messages. In some embodiments, the ranging can be performed by the mobile sending a ranging request message to one or more antennas of the vehicle. The vehicle antennas can respond, where the mobile device can potentially receive the ranging response messages at different times. Such an example using three antenna nodes is provided in FIG. 4. Other examples could include more antenna nodes, e.g., 6-8. A single node can have one transceiver and potentially more than one antenna.

Figure 4:
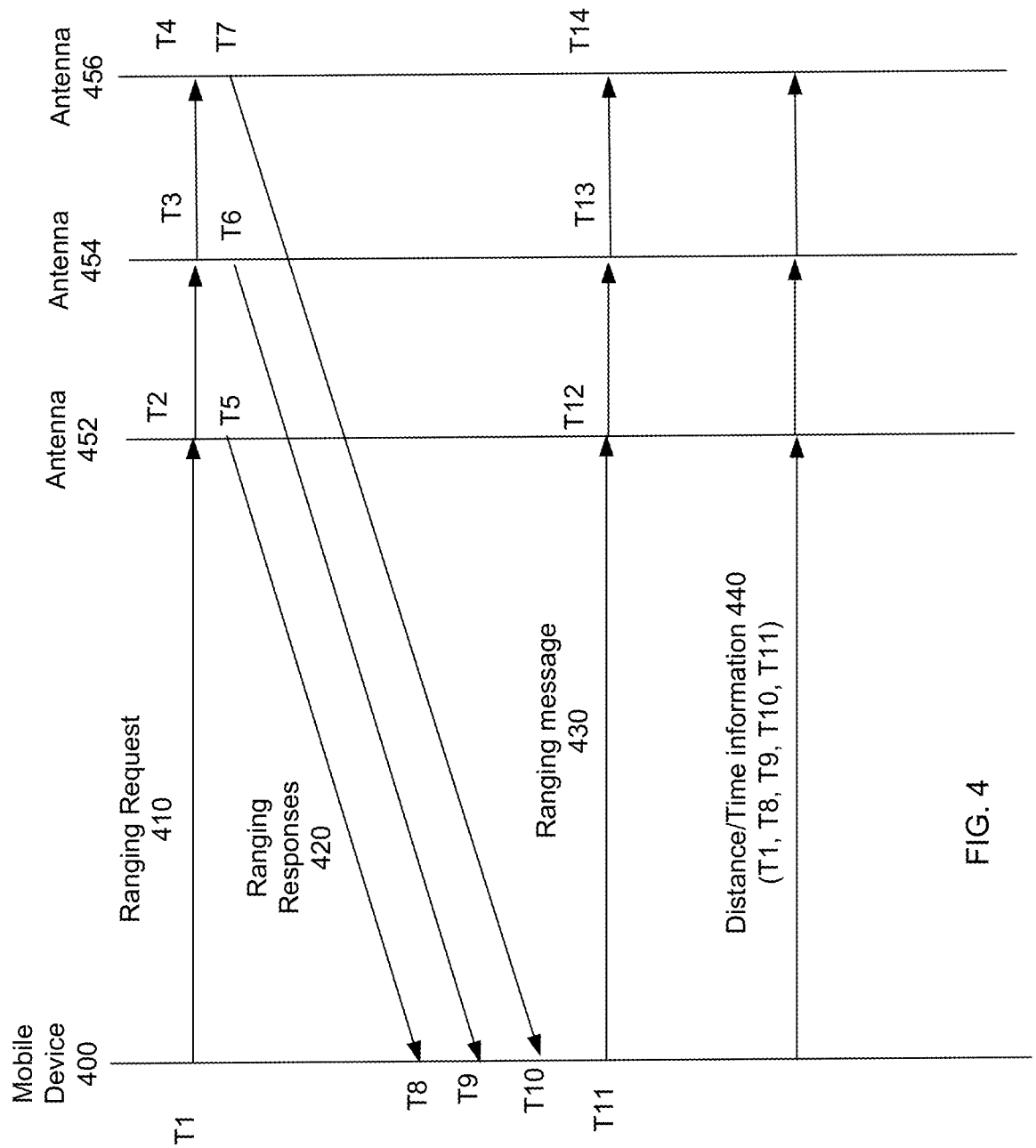
FIG. 4 shows a sequence diagram of a ranging operation involving a mobile device and three antennas of a vehicle according to embodiments of the present invention.

FIG. 4 shows a sequence diagram of a ranging operation involving a mobile device 400 and three antennas 452-456 of a vehicle according to embodiments of the present invention. In this example of FIG. 4, mobile device 400 broadcasts a single packet that is received by antennas 452-456 (e.g., each of a different node). In another implementation, mobile device 400 can send a packet to each node, and have each node respond to that distinct packet. The vehicle can listen at a specified antenna so that both devices know which vehicle antenna is involved, or a packet can indicate which antenna a message is for. For example, a first antenna can respond to a received packet; and once the response is received, another packet can be sent to a different antenna. But, this alternative procedure takes more time and power.

FIG. 4 shows a ranging request 410 sent at T1 and being received at antennas 452-456 at times T2, T3, and T4, respectively. Thus, the antennas (e.g., UWB antennas) listen at substantially the same time and respond independently. Antennas 452-456 provide ranging responses 420, which are sent at times T5, T6, and T7, respectively. Mobile device 400 receives the ranging responses at times T8, T9, and T10, respectively. An optional ranging message 430 can be sent (shown at T11) that is received by antennas 452-456 at times T12, T13, and T14, respectively. Distance/time information 440 can be sent after a set of ranging messages and may only need to be received by one antenna, which can relay the information to a control unit. In the example shown, time stamps tracked by mobile device 400 are sent to at least one of antennas 452-456, so that the vehicle can determine the distance from the vehicle, e.g., based on the locations of the antennas in the vehicle. In other examples, mobile device 400 can determine a distance and send the distance to the vehicle.

In some embodiments, to determine which ranging response is from which antenna, the vehicle can inform the mobile device of the order of response messages that are to be sent, e.g., during the ranging setup handshake. In other embodiments, the ranging responses can include identifiers, which indicate which antenna sent the message. These identifiers can be negotiated in the ranging setup handshake.

Use of ranging message 430 can allow improved accuracy. The antennas can be on a synchronized clock with each other, but the response times (e.g., delay between T2 and T5) can have different delays, e.g., T5-T2 and T6-T3 can be different. Ranging message 430 can provide resilience to the turnaround times being different for each of the antenna nodes. Such differences in turnaround times can result in ranging errors of a meter or two meters. By adding ranging message 430, embodiments can reduce an error due to the different turnaround times.

Messages 410-430 can include very little data in the payload, e.g., by including few pulses. Using few pulses can be advantageous. The environment of a vehicle and a mobile device (potentially in a pocket) can make measurements difficult. As another example, a vehicle antenna might face a different direction than the direction from which the mobile device is approaching. Thus, it is desirable to use high lower for each pulse, but there are government restrictions (as well as battery concerns) on how much power can be used within a specified time window (e.g., averaged over 1 millisecond). The packet frames in these messages can be on the order of 150 to 180 microseconds long. The packet frame in message 440 can be longer, e.g., 200 or 250 microseconds long.

At 311, further ranging can be performed. For example, more than one distance can be determined, which can be used to determine a trajectory. If the trajectory indicates movement toward the vehicle (e.g., distances are getting smaller for a specified number of measurements), the vehicle can infer intent of the user to enter the vehicle. As another example, different operations can be performed at different distance thresholds, e.g. turning on lights at one distance threshold, unlocking the vehicle at a closer distance threshold, and enabling the engine to turn on (e.g., after the user presses a button) at an even closer distance threshold.

At 312, the engine control unit of vehicle 350 can determine which operation(s) to perform based on the distance and/or a rate of change of the distance, as well as a trajectory. The specific operations can depend on setting(s) programmed by a user into the mobile device and/or the vehicle. Further communications between the mobile device and the vehicle can also be used to determine which operations to perform, including communications over BT, e.g., a user can be prompted about whether to turn on air conditioning or a heater.

D. Pulses

Each one of ranging messages (also referred to as frames or packets) can include a sequence of pulses, which can represent information that is modulated. Each data symbol in a frame can be a sequence. The packets can have a preamble that includes header information, e.g., of a physical layer and a MAC layer, and include a destination address. In some implementations, a packet frame can include a sync part and a start frame delimiter (SFD), which can line up timing.

A packet can include how security is configured and include encrypted information, e.g., an identifier of which antenna sent the packet. The encrypted information can be used for authentication. For a ranging operation, the content of the data may not need to be determined. In some embodiments, a timestamp for a pulse of a particular piece of data can be used to track a difference between transmission and reception. Thus, content can be used to match pulses. In some implementations, the encrypted information can include an indicator that authenticates which stage the message corresponds, e.g., ranging request 410 can correspond to stage 1, ranging responses 420 can correspond to stage 2, and ranging message 430 can correspond to stage 3.

E. Determining Distance

The narrow pulses (e.g., ~1 ns width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging wave form of plus 1's and minus 1's in some pattern that is recognized by a receiver.

The distance measurement can use a round trip time measurement, also referred to as a time-of-flight measurement. As described above, the mobile device can send a set of timestamps, which can remove a necessity of clock synchronization between the two devices.

III. Authentication and Establishing Secure Channel (Pairing)

As described above, the BT communication channel (or parts thereof) can be established during a pairing process, e.g., when a user obtains a new mobile device and/or new vehicle. In some implementations, the pairing is initiated by the vehicle starting BT advertising. The advertising payload to initiate pairing can include various data. In other implementations, the mobile device can initiate a pairing with the vehicle. Once the pairing is complete, the mobile device can set up a channel (e.g. a connection-oriented L2CAP channel). The connection-oriented channel can be is used to exchange ranging service messages to exchange capabilities and exchange security keys to complete UWB pairing.

Once the vehicle and iOS devices are paired, subsequent BT connections can be initiated by the vehicle. The vehicle can also initiate a standard BT encryption handshake to setup an encrypted link using the link keys created during pairing. The mobile device or the vehicle can initiate UWB ranging by first initiating a ranging handshake over BT. Further details on pairing are provided below.

Pairing is how two devices (e.g., a phone and a control unit of a vehicle) associate themselves with one another to create a connection (e.g., a Bluetooth® connection). Once pairing has occurred, two devices may communicate with each other. Pairing is generally initiated manually by a user, e.g., by selecting a discovered device on a settings page of the initiator device. The initiator device can then transmit a pairing request to a responder device with which it is not yet paired. Pairing usually occurs one time between two devices. After pairing, connections between the two devices are authenticated automatically.

For pairing to proceed, a password or "Passkey" can be exchanged between the two devices for authentication. The Passkey is used to ensure that both devices have agreed to pair with each other. When two devices are paired, the devices can be sure about the identity of the other device. To complete the pairing, the two devices generate a shared secret key(s) that are used for all future communication between the devices.

For Bluetooth (BT) low energy, the Security Manager Protocol (SMP) carries out the pairing in three phases. In phase 1, the two devices announce their input and output capabilities, which are used to determine a suitable method for phase 2. In phase 2, the two devices authenticate each other and determine the key generation method for keys used in phase 3. More specifically, in phase 2, the two devices use the IO capabilities from the pairing request and pairing response packet in phase 1 to determine which authentication method to use. Four authentication techniques are typically available: Just Works, Numeric Comparison, Passkey, and Out of band (OOB). In phase 3, each device may distribute to the other device one or more keys for future communication. Example keys include: (a) a Long Term Key (LTK) used to generate the session key for an encrypted connection, (b) a Connection Signature Resolving Key (CSRK) used to sign data and verify signatures, and (c) an Identity Resolving Key (IRK) used to generate a private address. In Bluetooth® 4.2 devices, the LTK is exchanged/generated using Elliptic Curve Diffie Hellman (ECDH) public key cryptography.

In Just Works™, the devices exchange their public keys. Then, the responder device generates a nonce (e.g., a random seed value) and uses the nonce and both public keys to generate a confirmation value Cb. The responder device then sends the Cb along with the nonce to the initiator device. The initiator device then uses the responder device's nonce (along with both public keys) to generate its own confirmation value Ca, which should match Cb. If the confirmation values match, then the connection proceeds. The initiator device can generate its own nonce and send it to the responder device, which can perform its own verification.

Numeric Comparison follows the same procedure as Just Works™, but adds another step at the end. Once the two devices confirm that the confirmation values match, both devices independently generate a final 6 digit confirmation value using both of the nonces. The devices both display their calculated values to the user. The user then manually checks that both values match and confirms the connection. This extra step allows this pairing method to provide protection from man-in-the-middle (MITM) attacks.

In Passkey, a 6 digit number is input into one or both of the devices. The two devices use the passkey, public keys previously exchanged, and a nonce to authenticate the connection. This process can be done bit by bit for every bit of the passkey. For example, one device will compute a confirmation value for one bit of the passkey and reveal it to the other device. The other device will then compute its own confirmation value for the first bit of its passkey and reveal it to the first device. This process continues until all the bits of the passkey has been exchanged and verified to match. This passkey method is resilient to MITM attacks.

Out of band (OOB) uses an external means of communication, such as Near Field Communication (NFC) to exchange some information (e.g., the public keys, nonces and confirmation values) used in the pairing process. Pairing is completed using the Bluetooth® radio, but requires information from the OOB mechanism. This provides only the level of MITM protection that is present in the OOB mechanism.

Figure 5:
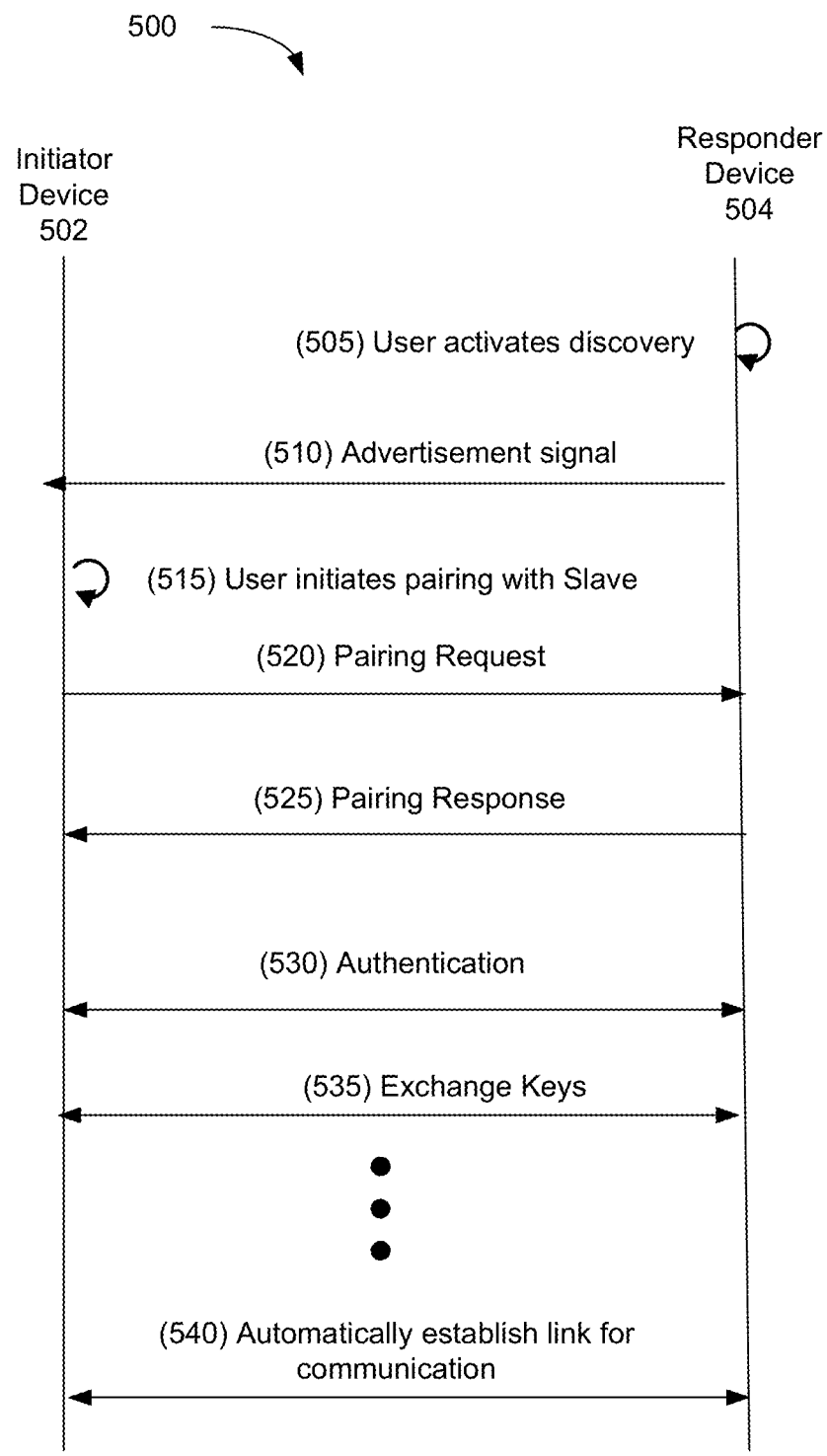
FIG. 5 shows a sequence diagram of a pairing process according to embodiments of the present invention.

FIG. 5 shows a sequence diagram of a pairing process 500 according to embodiments of the present invention. Pairing process involves an initiator device 502 (e.g., a phone) and a responder device 504 (e.g., a vehicle). Each device determines its capability for input and output (IO). For each device in a paring link, the IO capability determines their ability to create encryption shared secret keys. Public key cryptography can be used.

In step 505, a user activates a discovery mode on responder device 504. To be found by other Bluetooth devices, a device should be set to discoverable mode so that an advertisement signal is sent. The advertisement signal allows other devices in the vicinity to detect its presence and attempt to establish a connection. For example, a user can activate a button on responder device 504.

In step 510, responder device 504 emits an advertisement signal in response to the user activation. Initiator device 502 can detect the advertisement signal. For example, initiator device 502 can periodically scan for advertisement signals. A user can enable initiator device 502 to perform such scans and set a scan rate, or a scan rate can be set by default. The advertisement signal can include an identifier of the type of device (e.g., phone, headset, etc.), a device name (e.g., allocated by user or manufacturer), and the like.

In step 515, the user initiates a pairing process by providing user input at a user interface of responder device 504. For example, the user can navigate to a settings page, determine that responder device 504 has been detected via the advertisement signal, and select an option to pair with responder device 504.

In step 520, a Pairing Request message is sent from initiator device 502 to responder device 504. As examples, the Pairing Request message can include IO capabilities of initiator device 502, authentication data availability, authentication requirements, key size requirements, and other data.

In step 525, a Pairing Response message is transmitted from responder device 504 and contains much of the same information as the Pairing Request message. Steps 520 and 525 can occur as part of phase 1. The devices can use the information in the messages to perform authentication, e.g., to select an authentication option and implement authentication.

In step 530, authentication is performed, e.g., via one of the four modes discussed above. The authentication can establish that a device is communicating with another device corresponding to the encryption keys being used. Authentication can be confirmed by one device or both devices. Authentication can be performed as phase 2.

In step 535, keys are exchanged, e.g., as part of phase 3. The exchange of keys can correspond to a bonding process so that pairing (e.g., phases 1 and 2) do not have to be performed each time the devices connect (link) to each other. Thus, the keys can be used to encrypt future communications. For example, an advertisement signal can identify the responder device, and the initiator device can determine that the two devices have already been paired. The initiator device can then proceed to use one or more keys to send a message to the responder device, which can use its stored keys to decrypt or otherwise read the message.

In step 540, at a later time, a link for communication is automatically established between the devices. As just explained, this link can use the exchanged keys. And, since the devices have already been paired, messages can immediately be sent across the link, once an advertisement signal has been detected. But, this automatic connection requires that a pairing process has already been performed. A device can determine that the other device has already been paired by comparing data in the advertisement signal to a list of devices that have already been paired.

IV. Ranging Service—First Protocol

In various embodiments, the ranging service may be instantiated as a primary service or as a secondary service. In some examples provided, the ranging service defines messages that may be exchanged over a BT connection oriented channel. Both the mobile device and the vehicle may support a database and can use defined procedures to interact with database, independent of the ranging service. The vehicle can act as a central device and can open the channel. Aspects of a protocol for establishing the ranging service using the first wireless protocol (e.g., for implementing security handshake 307, data exchange 308, and ranging setup handshake 309) is described below, followed by some example message sequences.

A. Protocol

An example format for a ranging service message format can provide a code (e.g., one octet long) that indicates the type of the message. The length field (e.g., two octets long) can indicate the size in octets of the data field of the message, which may not include the code and length fields. The data field can be variable in length. Thus, the code field can determines the format of the data field and the length field can indicate the length of the data field. The sections below provide example details for ranging service messages to negotiate, initiate, and complete UWB ranging between the mobile device and the vehicle.

1. Ranging Capability Request/Response

The ranging setup (capability) handshake can be initiated at the start of every connection to exchange state of UWB devices on the mobile device and the vehicle. The ranging capability request message can have a particular ID code (e.g., 1). Some example parameters for this message include supported features mask, required features mask, software version, link identifier, number of UWB radio devices, and a UWB device descriptor.

The software version parameter can indicate the current ranging software version running on the initiator device. The link identifier can be a random number that allows the responder to match the received UWB packets to the BT connection with the initiator. Thus, the link identifier can be included in UWB messages.

Both the mobile device and the vehicle can maintain two features masks: a supported features mask and required features mask. The supported features mask can indicates supported features. The features mask parameter can be a bit mask of all features. For each feature, a single bit can be specified, e.g., set to 1 if the feature is supported and set to 0 otherwise. Example features are secure ranging, 1-1 ranging (e.g., 1 device to 1 device), and 1-many ranging (e.g., 1 mobile device to multiple vehicles or multiple vehicles to multiple mobile devices. The required features mask can indicate required features. For example, support for secure ranging and 1:1 ranging can be mandatory.

The UWB device descriptor can have one entry for each available UWB antenna device (e.g., antenna or node with more than one antenna). A features request message can have one UWB device descriptor entry for each UWB device on the initiating device. Each of the UWB antenna devices can be characterized by a UWB device descriptor with the following parameters: firmware version—version of current UWB firmware; hardware version—version of current UWB hardware; manufacturer name—name of UWB manufacturer.

The number of UWB devices available can be specific to a particular ranging session. The link identifier can map a BT link to UWB packets. Calibration data can be exchanged at pairing or at every connection.

The ranging capability response message can be similar to the ranging capability request message. The responder may be designated for sending this message. If the responder does not support any feature listed in the required features of the ranging capability request message, the responder can respond with an additional ranging command complete message with an unsupported feature error code. The ranging capability response message can includes the parameters: supported features, software version, number of UWB devices, and UWB device descriptor.

2. Ranging Security Key Request/Response

The request and response can be used in a handshake to exchange keys and derive a shared secret at pairing. A periodic key refresh can also be used. In some implementations, a handshake can be performed at every connection and implement challenge/response.

3. Ranging Start/Stop Request

A ranging session can be initiated by sending a ranging start request command containing a set of parameters. The receiving device can decide whether to suggest different parameters by replying with its own ranging start request or to accept the request. If the receiving device decides to accept the request, it can send a ranging start notification event. If secure ranging is required and security handshake is not completed, this request can be rejected with an additional ranging command complete message with an insufficient authentication error code.

Examples for the ranging start request can include: a minimum ranging interval (e.g., 30 ms), a maximum ranging interval (e.g., 2,550 ms), a ranging offset (e.g., 30 ms to 2,550 ms), and a ranging timeout (e.g., 300 ms to 25.5 s). The ranging interval can defines the amount of time between each consecutive ranging attempts. The minimum and maximum ranging intervals can specify the acceptable minimum and maximum ranging periods, e.g., in units of milliseconds. Either the mobile device or the vehicle may request to start ranging.

The ranging mode may be exit by either the mobile device or the vehicle by sending a ranging stop request. The requested device can respond with a ranging command complete with status code of success.

4. Ranging Event Notification

The event notification can be used to encapsulate events that are generated by the central and peripheral devices. A subevent code can be the first of the event parameters (e.g., the first octet) with subevent parameters following. Examples of the ranging subevent types are as follows: ranging command complete subevent (parameters: status); ranging capability update subevent (parameters: number of UWB Devices and UWB device descriptor); ranging start subevent (parameters: ranging interval and ranging offset); ranging session status changed subevent (parameters: session status); and ranging device status changed subevent (parameters: device status).

The ranging command complete subevent can be sent by the responder and indicate that the command sent by the initiator was completed. The status parameter can indicate whether the command was successful.

The ranging capability update subevent can indicate any change in the availability of UWB sensors for ranging. This event is an optional and may be ignored by the receiving device. This event can be used to indicate that the Initiator device has a subset of UWB sensors are that unavailable or preferred for initial ranging. A parameter for this event can be the number of UWB devices.

The ranging start subevent can be sent in response to the ranging start request from the initiator. The responder can send this event with the accepted ranging interval and a ranging offset. The ranging offset parameter can provide a coarse estimate of the start UWB session relative to this event. This event can be used to trigger a one shot, immediate ranging session by setting the ranging interval and offset to 0. A prior ranging start request message is not required for an immediate ranging session. The responder may be ignored by the immediate request. The parameter of the ranging interval can be 30 ms to 2,550 ms and can be set to 0 to request immediate ranging. The parameter of the ranging offset can be 30 ms to 2,550 ms and can be set to 0 to request immediate ranging.

A set of ranging session status changed subevent can be generated to indicate the start, progress, and completion of a UWB-related action. These sub-events can be generated by both the mobile device and the vehicle. The security key refresh event may be initiated by the vehicle or the mobile device to request a new set of security keys. The lock and unlock events can be generated by the vehicle after a successful ranging session. Example of this set of subevents include: ranging session key refresh subevent (e.g., if initiator requires refresh of all security keys); ranging session lock started subevent (e.g., if initiator is performing a lock operation); ranging session lock completed subevent (e.g., if initiator has completed the lock operation); ranging session unlock started subevent (e.g., if initiator is performing an unlock operation); ranging session unlock completed subevent (e.g., if initiator has completed the unlock operation); ranging session ignition started subevent (e.g., if initiator is performing an immobilizer operation); ranging session ignition completed subevent (e.g., if initiator has completed the immobilizer operation); and ranging session timed out subevent (e.g., if initiator has stopped ranging due to timeout).

A set of ranging device status changed subevent can be generated in response to a change in state in the vehicle or the mobile device. The device status parameter indicates the new status of the initiator. Examples subevents include: ranging device disabled subevent (e.g., if initiator does not recognize the receiver as valid key); ranging device authenticated subevent (e.g., if initiator has completed local authentication of the device); and ranging device enabled subevent (e.g., if initiator recognizes the receiver as valid device).

The ranging device disabled subevent can be used by the vehicle to indicate that the mobile device is disabled and no longer capable of performing any action until the mobile device completes user authentication. If the initiator or responder decides to stop any existing ranging session in response to this event, it can send a ranging stop request message.

The ranging device authentication completed subevent can indicate that the initiator device has performed local authentication of the user. The responder may accept this event and enable the initiator device to perform actions on the responder.

The ranging device enabled subevent can be used by the initiator to indicate that the receiver is re-enabled as a valid device to perform any action on the initiator. A ranging session may be started by initiator or receiver in response to this event.

The ranging devices can use the error code that closely matches its error situation. Example error codes include: success; insufficient authentication; ranging timeout; maximum ranging clients limit exceeded; and unsupported feature.

B. Message Sequence

This section shows example interactions between the vehicle and a mobile device using the ranging service messages. It assumes that a communication channel is already established.

Figure 6:
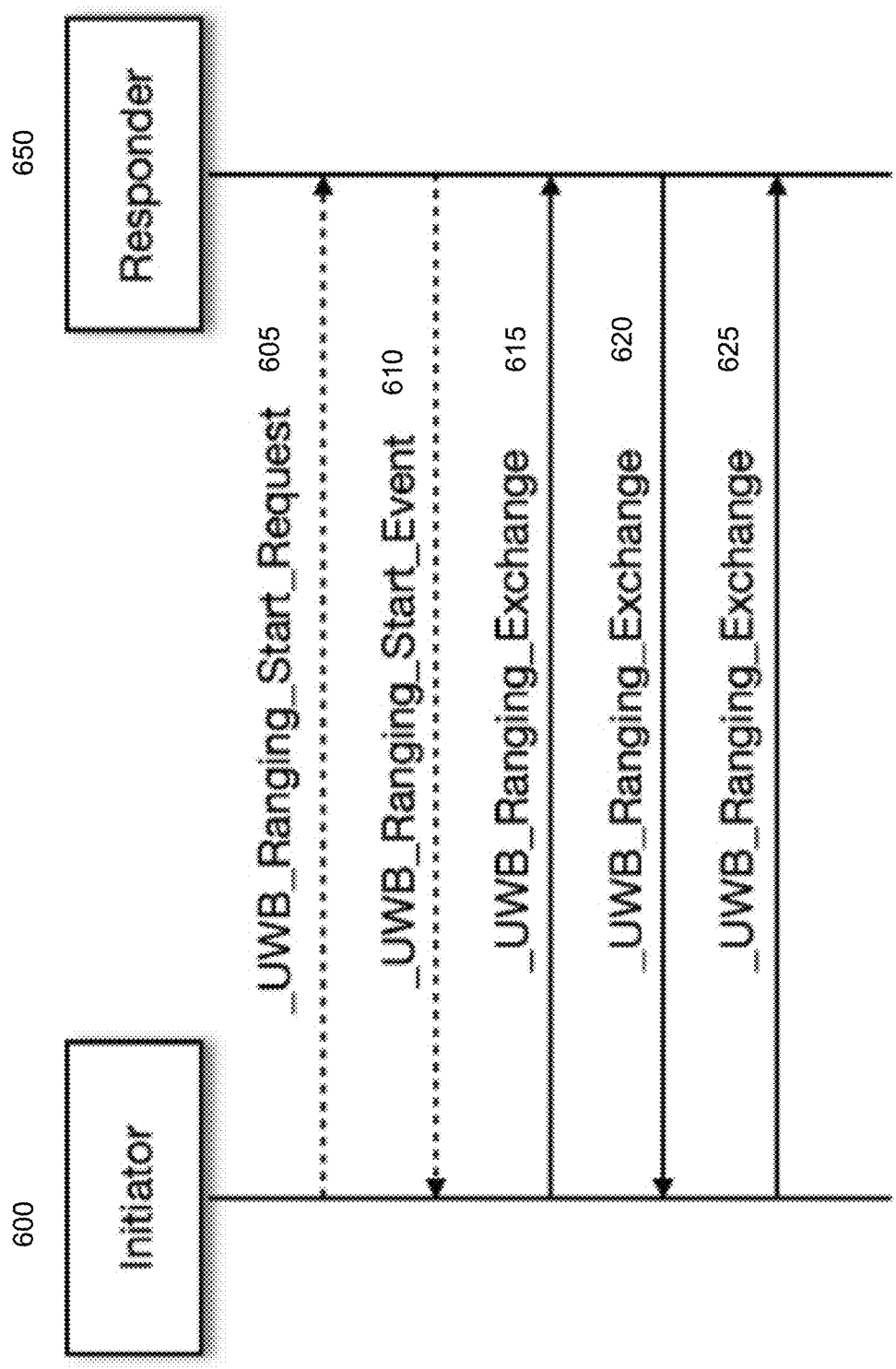
FIG. 6 shows a ranging interval negotiation according to embodiments of the present invention.

FIG. 6 shows a ranging interval negotiation according to embodiments of the present invention. A first ranging start request can be sent by an initiator 600 to a responder 650. Responder 650 can send a second ranging start request 610 of it owns in response, but with a different set of ranging parameters. Ranging exchange messages 615-625 can be sent as part of negotiating the ranging capabilities e.g., as defined by parameters). If the ranging parameters from the remote side are acceptable, responder 650 can send a ranging start subevent with parameters for the ranging session.

Figure 7:
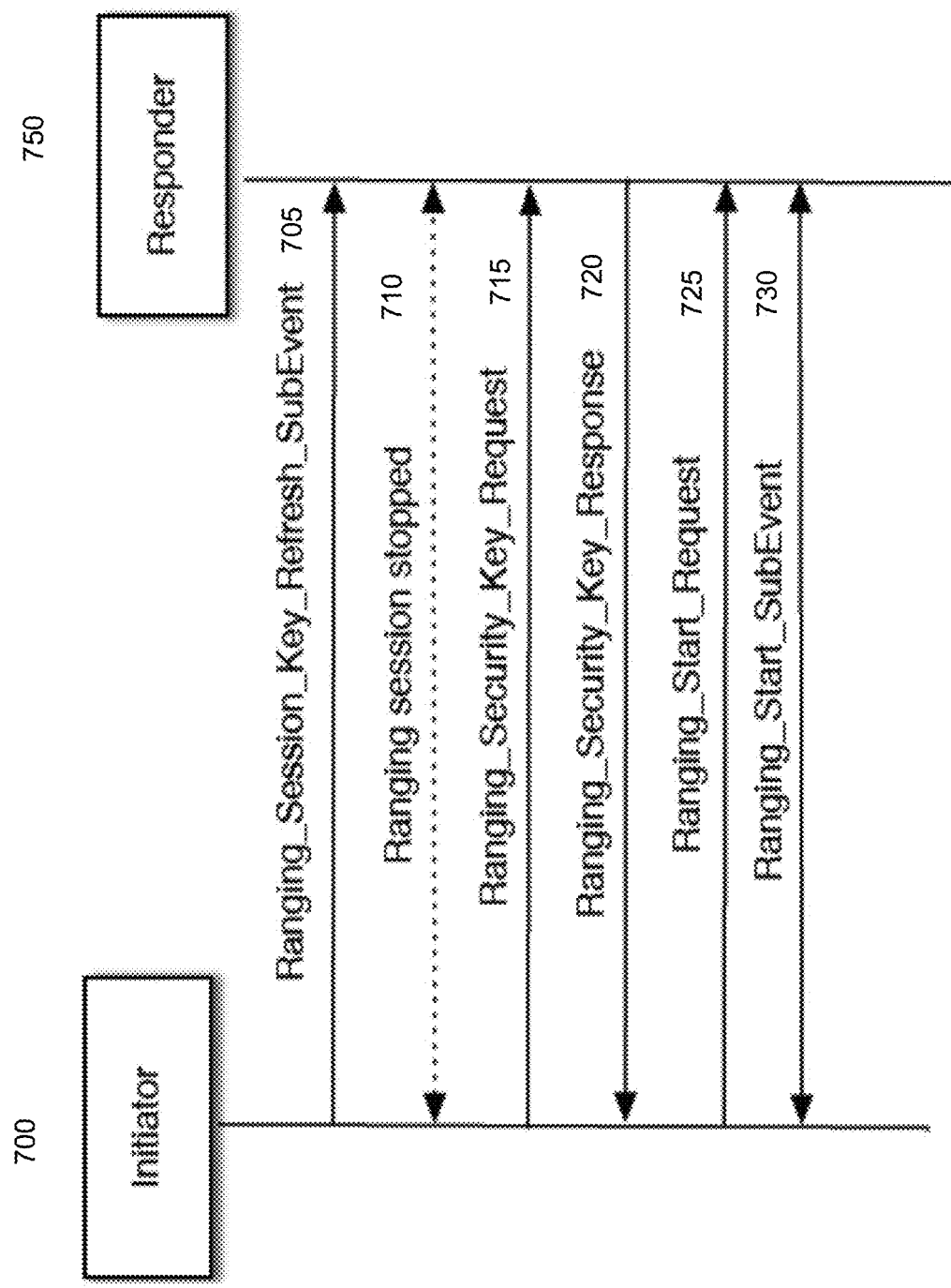
FIG. 7 shows a key refresh negotiation according to embodiments of the present invention.

FIG. 7 shows a key refresh negotiation according to embodiments of the present invention. A security key refresh request 715 may be initiated by an initiator 700 (the mobile device or the vehicle) after a refresh subevent 705 and stop message 710 have been sent, after which UWB ranging session can be paused. Initiator 700 can provide security parameters for the subsequent ranging session to responder 750, which can provide security key response 720. Once the security keys are refreshed successfully, initiator 700 can start a new UWB ranging session using a ranging start request message 725 followed by a start subevent 730.

The ranging key refresh handshake can be required to be completed within a specified time. If the timer expires before the handshake is completed, the ranging session may be resumed with the current security parameters. The UWB radios may need to resynchronize to compensate for any drift caused by the timeout.

V. Ranging Service—Second Protocol

A description of examples messages used for the ranging service via the second wireless protocol (e.g., UWB) are described below, along with an example message sequence. Further details of UWB messaging can be found in "IEEE Standard for Low-Rate wireless networks" for IEEE Std 802.15.4™ (2016), which is incorporated by reference.

A. Protocol

A UWB ranging start request is an optional message that can indicate the start of a UWB ranging session to allow precise coordination between the initiator and responder.

A UWB ranging stop request is an optional message that can indicate the end of a ranging session. The session can end because keys need to be updated, e.g., because there is no longer a need to carry out device-to-device ranging, or because one or more devices want to end ranging.

A UWB ranging start event message can be sent in response to a UWB ranging start request message. A UWB ranging stop event message can be sent in response to a UWB ranging stop request message.

A UWB ranging exchange message can have a dual-purpose of providing an optionally-encrypted preamble for secure ranging and transferring necessary round-trip-time timestamps between the initiator and the responder. Example parameters for this message can include a validity time, transmit and receive timestamps, timestamp uncertainties, timestamp validity, RSSI, and status. This event can be triggered as part of a single two-way ranging exchange, or more three-way ranging exchanges for either one-to-one ranging or one-to-many ranging.

A further description of example parameters of a UWB ranging exchange message re as follows. The validity timestamp can be in absolute time base. The number of ranging nodes can correspond to the number of valid ranging timestamps in the message. An index (node_x_index) can be an index into the responder node list. A ranging timestamp node_x can correspond to a timestamp of the most recently received or transmitted UWB packet from a particular node. The ranging timestamp uncertainty node_x 1, e.g., which can have a range of values from 1.5 cm-3.6 m at various confidences. RSSI node_x 1 can be the RSSI in dBm of a received packet. The ranging status node_x can provide a status of node x. Node x_antenna can define which antenna for node_x received or transmitted the packet.

Example UWB ranging status can be as follows: success (successful receipt and transmission of a packet); timestamp overflow (timestamp counter overflowed); transaction expired (transaction took too long and expired); frame too long; unavailable key (key not available for secure ranging); unsupported security (secure ranging mode not supported); and unsupported ranging (ranging mode not supported).

B. Message Sequence

In some embodiments of one-to-one ranging, each responder (e.g., UWB radio) can carry out a UWB ranging exchange with the initiator as soon as responder can see the first UWB ranging exchange packet. FIG. 6 shows a double-sided two-way ranging with a three-packet exchange. One optional exchange not shown is the final packet's receive time at responder 650 being sent to initiator 600. This may be performed if the initiator wants to compute a more-accurate range from all the timestamps.

Figure 8:
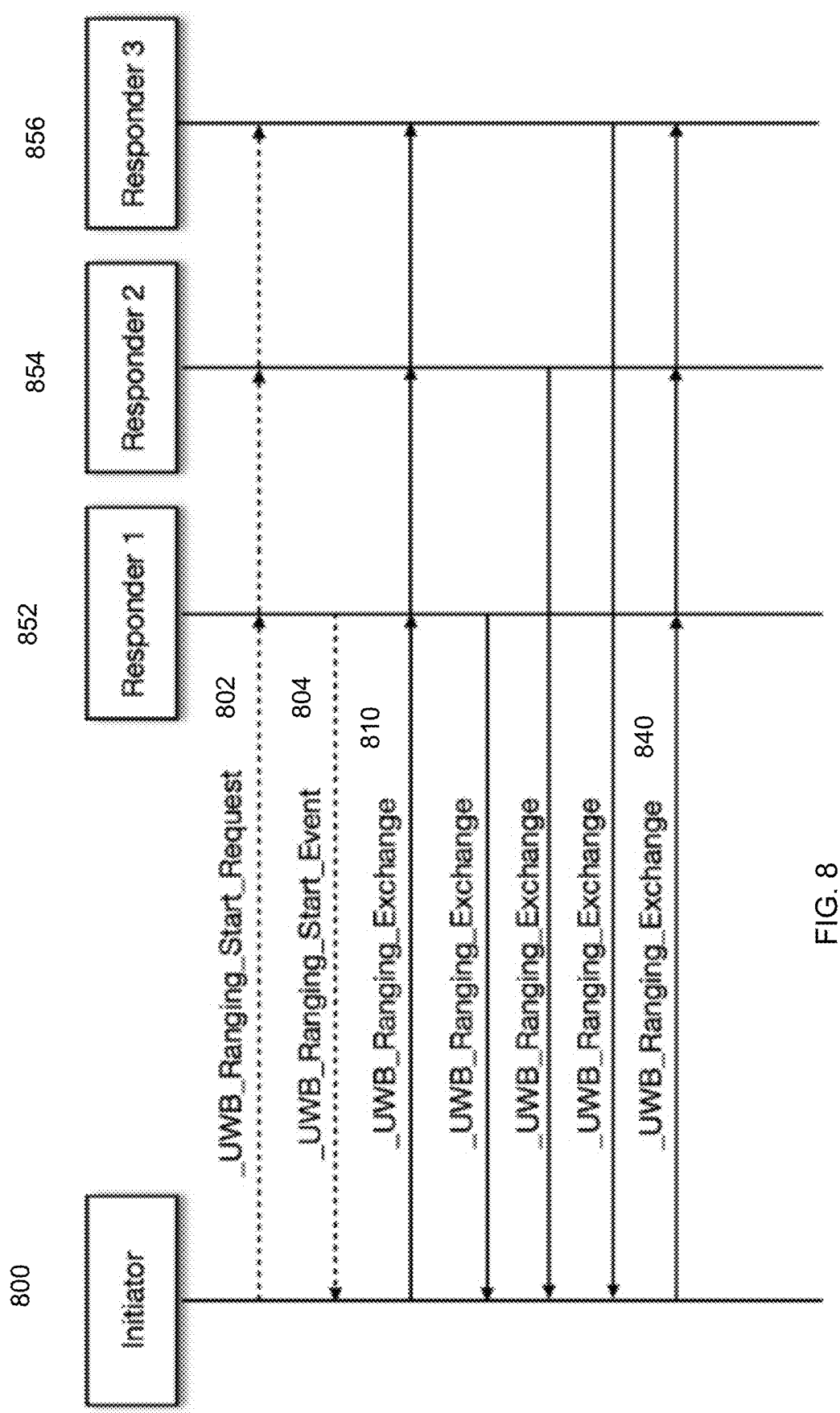
FIG. 8 shows a one-to-many ranging according to embodiments of the present invention.

FIG. 8 shows a one-to-many ranging according to embodiments of the present invention. One-to-many ranging can have each responder carry out a UWB ranging exchange, e.g., with the initiator in a predetermined sequential order after the first UWB ranging exchange packet from the initiator.

FIG. 8 shows double sided two-way ranging with a three packet exchange between an initiator 800 and each of three responders 852-856. A ranging start request 802 (e.g., using a first wireless protocol) can be received by responders 852-856, which can respond with a ranging start even message 804. Responders 1, 2, and 3 each receive the first ranging packet 810 from initiator 800, but respond at different times. They also can all receive a final ranging packet 840 from initiator 800, which can correspond to message 430 of FIG. 4. One optional exchange is the receive time of message 840 at each responder 852-856 being sent back to initiator 800. This can be performed if initiator 800 wants to compute a more-accurate range from all the timestamps.

To support one-to-many ranging, where the vehicle can include more than one UWB transceiver, special provisioning of the addressing can be defined. The 4 least significant bits (LSBs) of the source and destination address can be used to define the intended transceiver, with possible transceiver IDs, e.g., from 0x0 to 0xE. For one-to-many ranging, the destination address can be set to a particular value (e.g., 0xF) indicating the packet is destined for all transceivers.

VI. Method

Figure 9:
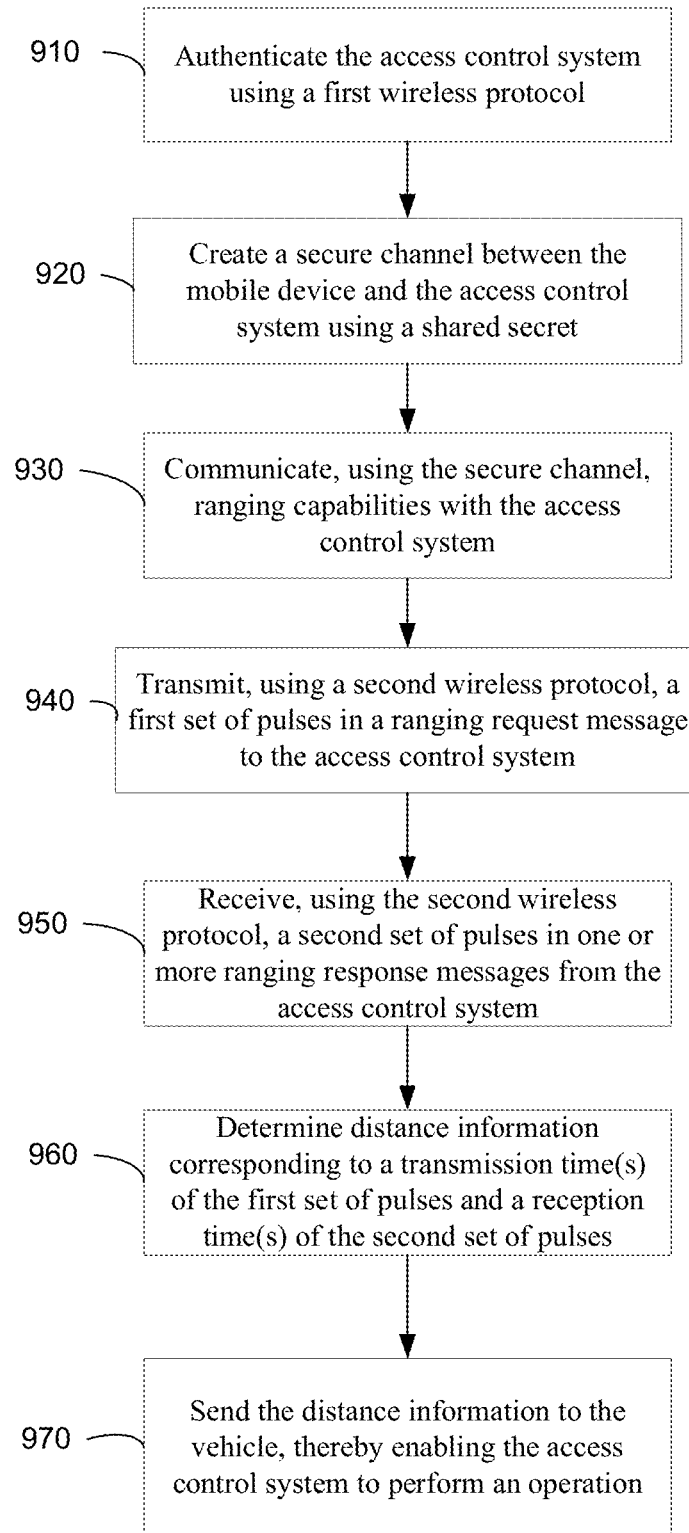
FIG. 9 is a flowchart of a method for performing communications between a mobile device and an access control system according to embodiments of the present invention.

FIG. 9 is a flowchart of a method 900 for performing communications between a mobile device and an access control system (e.g., that is associated with a vehicle or building) according to embodiments of the present invention. Method 900 can be performed by the mobile device (or other computing device), which can include one or more processors and a memory that stores program code for executing by the one or more processors. Aspects of method 900 can be performed in a similar manner is method 100.

At block 910, a first wireless protocol (e.g., over a first antenna) is used to authenticate the access control system. The first wireless protocol can be BT. The authentication can use information exchanged during a pairing process that was previously performed between the mobile device and the access control system (e.g., a vehicle), as is described herein. The authentication can involve a challenge-response procedure between the mobile device and the access control system. An identifier from the access control system can be used to determine the expected response for a given challenge, e.g., to retrieve a key expected to be used by the access control system to generate the response and use the key to authenticate the response (e.g., by decryption or regeneration of the response). The access control system can also authenticate the mobile device.

The authentication can be of a control unit of the access control system. For example, a challenge (e.g., a random number) can be sent to the access control system. A control unit (e.g., ECU in FIG. 3) of the access control system can operate on the challenge using an encryption key to provide a response. The encryption key can be derived or be a shared secret established during a pairing of the mobile device with the access control system. The response can be received from the access control system and compared to an expected result to authenticate the control unit of the access control system. As examples, the response can be decrypted and compared to the original challenge, or the mobile device can encrypt the challenge (e.g., using a same encryption key) and compare the result to the received response. As another example for authentication, a digital signature of a control unit of the access control system can be received using the first wireless protocol. The digital signature can be confirmed using a public key of the control unit, thereby authenticating the control unit of the access control system.

At block 920, after the authentication, a secure channel is created between the mobile device and the access control system (e.g., a control unit of a vehicle) using a shared secret. The secure channel can use the first wireless protocol. The shared secret can be established during a pairing process with between the mobile device and the access control system. The shared secret can be used in the authentication of block 910. The creation of the secure channel can be performed by accessing a database (e.g., a table) of paired devices using an identifier obtained from the access control system to determine one or more encryption keys, e.g., to derive or retrieve an Elliptic-curve Diffie—Hellman (ECDH) key pair.

At block 930, the secure channel is used to communicate ranging capabilities with the access control system for ranging to be performed using a second wireless protocol. As an example, the ranging capabilities can specify a format for ranging messages between the mobile device and the access control system, e.g., as described herein. Other examples for ranging capabilities include a number of antennas, location of those antennas (e.g., a relative distances between the antennas and/or between an origin in the access control system, such as the ECU), how many antennas to use, encryption protocols, packet format, modes of operation, and supported frequency range.

At block 940, a second wireless protocol can be used to transmit a first set of pulses in a ranging request message to the access control system. The second wireless protocol can use a pulse width that is less than a pulse width used by the first wireless protocol. In some embodiments, the first wireless protocol is Bluetooth® (e.g., BTLE) and the second wireless protocol is UWB.

At block 950, a second set of pulses in one or more ranging response messages are received from the access control system (e.g., using a second antenna). The one or more ranging response messages can be a plurality of ranging response messages (e.g., as shown in FIGS. 4 and 8). Each ranging response message can be from a different antenna unit (e.g., different nodes) of the access control system and include identifying information specific to a particular antenna unit, where such identifying information may be encrypted. In some implementations, the ranging request message can be broadcast to the plurality of ranging response messages, e.g., as in ranging request 410 of FIG. 4 or as shown in FIG. 8. In other implementations, separate ranging request messages can be sent to the various antenna units.

At block 960, distance information corresponding to a transmission time(s) of the first set of pulses and a reception time(s) of the second set of pulses is determined. The distance information can include timestamps corresponding to the first set of pulses in the ranging request message and the second set of pulses in the one or more ranging response messages, e.g., as shown in FIG. 4. The timestamps can be configurable to be used by a control unit of the access control system to determine a distance of the mobile device from the access control system, e.g., as described herein.

In some embodiments, the mobile device can determine the distance. For example, the mobile device can determine the distance using the transmission time(s) of the first set of pulses and the reception time(s) of the second set of pulses. Thus, the distance information can include the distance.

At block 970, the distance information is sent to the access control system, thereby enabling the access control system to perform an operation. The distance information can be sent using either the first wireless protocol (e.g., using the secure channel) or the second wireless protocol. In various embodiments, the operation can be unlocking a door of the access control system (e.g., all doors or a particular door based on user access privileges or a closest door), turning on a heater or air conditioner, or enabling a start button of the vehicle. Any of such operations can be triggered based on a distance or rate of change of the distance (e.g., speed toward the vehicle) exceeding a threshold. Multiple such thresholds may be used for different operations, e.g., as described herein.

VII. Example Device

Figure 10:
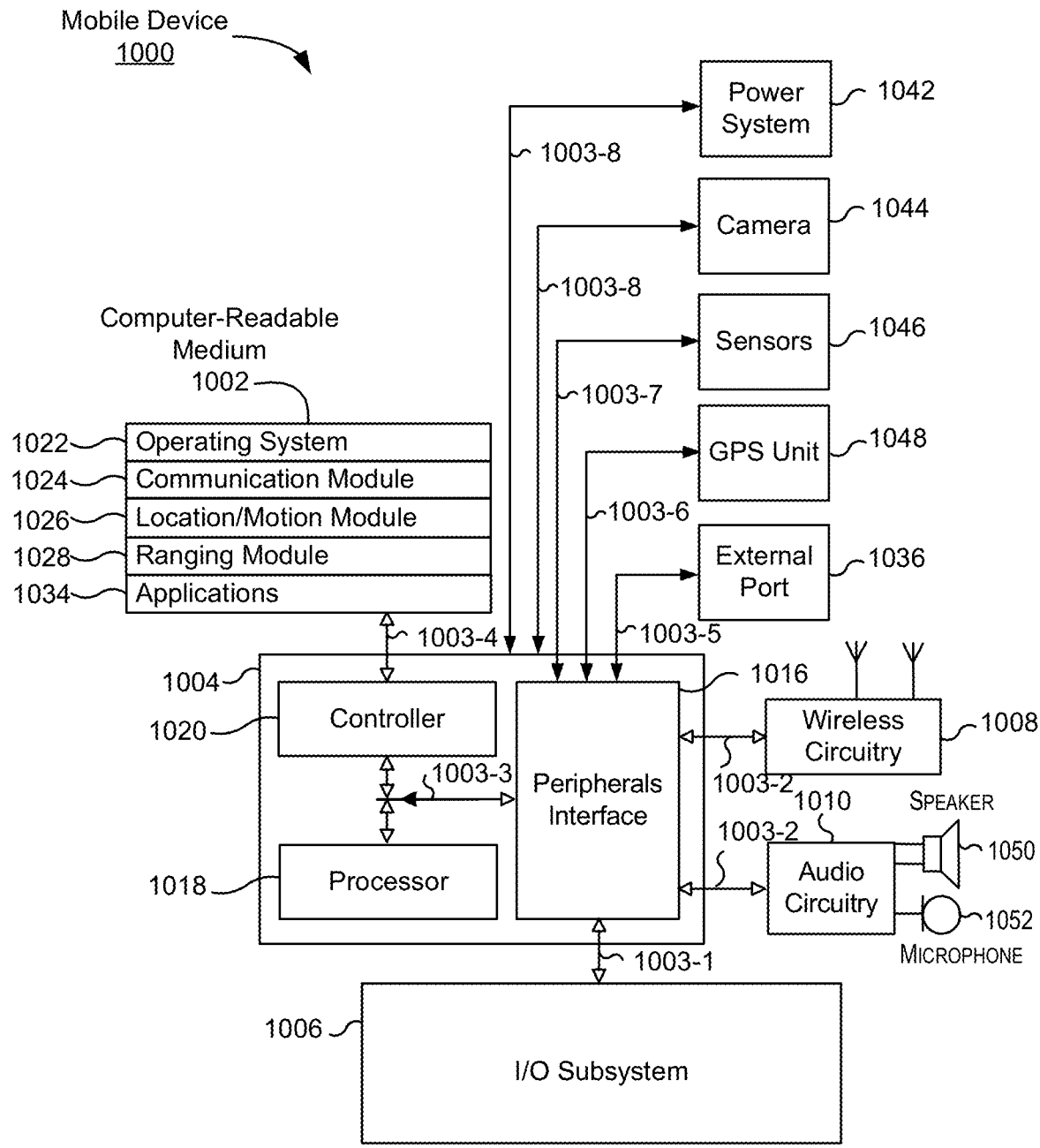
FIG. 10 is a block diagram of an example mobile device.

FIG. 10 is a block diagram of an example device 1000, which may be a mobile device. Device 1000 generally includes computer-readable medium 1002, a processing system 1004, an Input/Output (I/O) subsystem 1006, wireless circuitry 1008, and audio circuitry 1010 including speaker 1050 and microphone 1052. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1008 can use various protocols, e.g., as described herein. For example, wireless circuitry 1008 can have one component for one wireless protocol (e.g., Bluetooth®) and a separate component for another wireless protocol (e.g., UWB). Different antennas can be used for the different protocols.

Wireless circuitry 1008 is coupled to processing system 1004 via peripherals interface 1016. Interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats for one or more application programs 1034 stored on medium 1002.

Peripherals interface 1016 couple the input and output peripherals of the device to processor 1018 and computer-readable medium 1002. One or more processors 1018 communicate with computer-readable medium 1002 via a controller 1020. Computer-readable medium 1002 can be any device or medium that can store code and/or data for use by one or more processors 1018. Medium 1002 can include a memory hierarchy, including cache, main memory and secondary memory.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors 1046 can include accelerometers, compasses, gyrometers, pressure sensors, audio sensors, light sensors, barometers, and the like. Sensors 1046 can be used to sense location aspects, such as auditory or light signatures of a location.

In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1018 run various software components stored in medium 1002 to perform various functions for device 1000. In some embodiments, the software components include an operating system 1022, a communication module (or set of instructions) 1024, a location module (or set of instructions) 1026, a ranging module 1028 that is used as part of ranging operation described herein, and other applications (or set of instructions) 1034.

Operating system 1022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via wireless circuitry 1008 and includes various software components for handling data received from wireless circuitry 1008 and/or external port 1036. External port 1036 (e.g., USB, FireWire, Lightning connector, 60-pin connector, etc.) is adapted for coupling directly to other devices or indirectly over a network (e.g., the Internet, wireless LAN, etc.).

Location/motion module 1026 can assist in determining the current position (e.g., coordinates or other geographic location identifiers) and motion of device 1000. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1026 receives data from GPS unit 1048 and analyzes the signals to determine the current position of the mobile device. In some embodiments, location/motion module 1026 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1008 and is passed to location/motion module 1026. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1000 based on the position coordinates of the corresponding transmitters. Regardless of the specific location technology used, location/motion module 1026 receives information from which a location fix can be derived, interprets that information, and returns location information, such as geographic coordinates, latitude/longitude, or other location fix data.

Ranging module 1028 can send/receive ranging messages to/from an antenna, e.g., connected to wireless circuitry 1008. The messages can be used for various purposes, e.g., to identify a sending antenna of a vehicle, determine timestamps of messages (e.g., for sending to the vehicle), and potentially to determine a distance of mobile device 1000 from the vehicle.

The one or more applications programs 1034 on the mobile device can include any applications installed on the device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or track pad. In some embodiments, I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

Although the disclosure has been described with respect to specific embodiments, it will be appreciated that the disclosure is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

What is claimed is:

1. A method for performing communications between a mobile device and an access control system, the method comprising performing, by the mobile device:
   creating a communication channel between the mobile device and the access control system using a shared secret, the communication channel using a first wireless protocol;
   communicating, using the communication channel, one or more ranging capabilities with the access control system for ranging to be performed using a second wireless protocol;
   transmitting, using the second wireless protocol, a first set of pulses in a ranging request message to the access control system, wherein the second wireless protocol uses a pulse width that is less than a pulse width used by the first wireless protocol;
   receiving, using the second wireless protocol, a second set of pulses in one or more ranging response messages from the access control system;
   determining a transmission time(s) of the first set of pulses and a reception time(s) of the second set of pulses; and
   sending the transmission time(s) and the reception time(s) to the access control system, thereby enabling the access control system to perform an operation.

2. The method of claim 1, further comprising, before creating the communication channel, authenticating the access control system using the first wireless protocol.

3. The method of claim 2, wherein authenticating the access control system includes:
   sending a challenge to the access control system, the challenge to be operated on by a control unit of the access control system using an encryption key to provide a response;
   receiving the response from the access control system; and
   comparing the response to an expected result to authenticate the control unit of the access control system.

4. The method of claim 1, wherein the one or more ranging response messages include a plurality of ranging response messages from a plurality of antenna units of the access control system, each ranging response message from a respective antenna unit of the plurality of antenna units and including identifying information specific to the respective antenna unit.

5. The method of claim 4, wherein the ranging request message is broadcast to the plurality of antenna units.

6. The method of claim 1, further comprising:
   determining a distance of the mobile device from the access control system using the transmission time(s) of the first set of pulses and the reception time(s) of the second set of pulses.

7. The method of claim 1, further comprising:
   sending, to the access control system, timestamps corresponding to the first set of pulses in the ranging request message and the second set of pulses in the one or more ranging response messages, the timestamps configurable to be used by a control unit of the access control system to determine a distance of the mobile device from the access control system.

8. The method of claim 1, wherein the operation is to unlock a door of the access control system.

9. The method of claim 1, wherein the one or more ranging capabilities specify a format for ranging messages between the mobile device and the access control system using the second wireless protocol.

10. The method of claim 1, wherein the first wireless protocol is Bluetooth® and the second wireless protocol is ultra-wideband (UWB), wherein the first wireless protocol uses a first antenna and the second wireless protocol uses a second antenna, and wherein the mobile device is a mobile phone.

11. The method of claim 1, wherein the access control system is a vehicle.

12. A computer product comprising a non-transitory computer readable medium storing a plurality of instructions, that when executed, control a computing device to perform:
   creating a communication channel between the computing device and an access control system using a shared secret, the communication channel using a first wireless protocol;

communicating, using the communication channel, one or more ranging capabilities with the access control system for ranging to be performed using a second wireless protocol;

transmitting, using the second wireless protocol, a first set of pulses in a ranging request message to the access control system, wherein the second wireless protocol uses a pulse width that is less than a pulse width used by the first wireless protocol;

receiving, using the second wireless protocol, a second set of pulses in one or more ranging response messages from the access control system;

determining a transmission time(s) of the first set of pulses and a reception time(s) of the second set of pulses; and sending the transmission time(s) and the reception time(s) to the access control system, thereby enabling the access control system to perform an operation.

13. The computer product of claim 12, wherein the plurality of instructions further control the computing device to perform:

before creating the communication channel, authenticating the access control system using the first wireless protocol.

14. The computer product of claim 13, wherein authenticating the access control system includes:

sending a challenge to the access control system, the challenge to be operated on by a control unit of the access control system using an encryption key to provide a response;

receiving the response from the access control system; and comparing the response to an expected result to authenticate the control unit of the access control system.

15. The computer product of claim 12, wherein the one or more ranging response messages include a plurality of ranging response messages from a plurality of antenna units of the access control system, each ranging response message from a respective antenna unit of the plurality of antenna units and including identifying information specific to the respective antenna unit.

16. The computer product of claim 12, wherein the plurality of instructions further control the computing device to perform:

determining a distance of the computing device from the access control system using the transmission time(s) of the first set of pulses and the reception time(s) of the second set of pulses.

17. A mobile device comprising one or more processors configured to perform:

creating a communication channel between the mobile device and an access control system using a shared secret, the communication channel using a first wireless protocol;

communicating, using the communication channel, one or more ranging capabilities with the access control system for ranging to be performed using a second wireless protocol;

transmitting, using the second wireless protocol, a first set of pulses in a ranging request message to the access control system, wherein the second wireless protocol uses a pulse width that is less than a pulse width used by the first wireless protocol;

receiving, using the second wireless protocol, a second set of pulses in one or more ranging response messages from the access control system;

determining a transmission time(s) of the first set of pulses and a reception time(s) of the second set of pulses; and sending the transmission time(s) and the reception time(s) to the access control system, thereby enabling the access control system to perform an operation.

18. The mobile device of claim 17, wherein the one or more processors are further configured to perform:

before creating the communication channel, authenticating the access control system using the first wireless protocol.

19. The mobile device of claim 18, wherein authenticating the access control system includes:

sending a challenge to the access control system, the challenge to be operated on by a control unit of the access control system using an encryption key to provide a response;

receiving the response from the access control system; and comparing the response to an expected result to authenticate the control unit of the access control system.

20. The mobile device of claim 17, wherein the one or more processors are further configured to perform:

determining a distance of the mobile device from the access control system using the transmission time(s) of the first set of pulses and the reception time(s) of the second set of pulses.

* * * * *